United States Patent [19]

Massoth et al.

[11] 3,812,653

[45] May 28, 1974

[54] PROCESS FOR REDUCING THE ARSENIC CONTENT OF GASEOUS HYDROCARBON STREAMS BY USE OF SUPPORTED COPPER OR COPPER OXIDE

[75] Inventors: Franklin E. Massoth; John E. Young, Jr., both of Middlesex Twp., Butler County, Pa.

[73] Assignee: Gulf Research & Development Company, Pittsburgh, Pa.

[22] Filed: Apr. 27, 1972

[21] Appl. No.: 247,984

[52] U.S. Cl............................................ 55/68, 55/74
[51] Int. Cl............................................. B01d 53/04
[58] Field of Search.......... 55/48, 73, 74, 179, 387, 55/68; 196/44, 46; 208/88, 91; 423/210, 229, 234, 240

[56] References Cited

UNITED STATES PATENTS

| 2,779,715 | 1/1957 | Murray et al......................... 208/88 |
| 2,781,297 | 2/1957 | Appell................................. 208/88 |
| 3,501,897 | 3/1970 | Van Helden et al.................. 55/73 |

Primary Examiner—Charles N. Hart

[57] ABSTRACT

A process for reducing the arsenic content of a gaseous hydrocarbon stream by contacting the stream with a sorbent comprising copper or an oxide of copper dispersed upon a supporting material.

17 Claims, 1 Drawing Figure

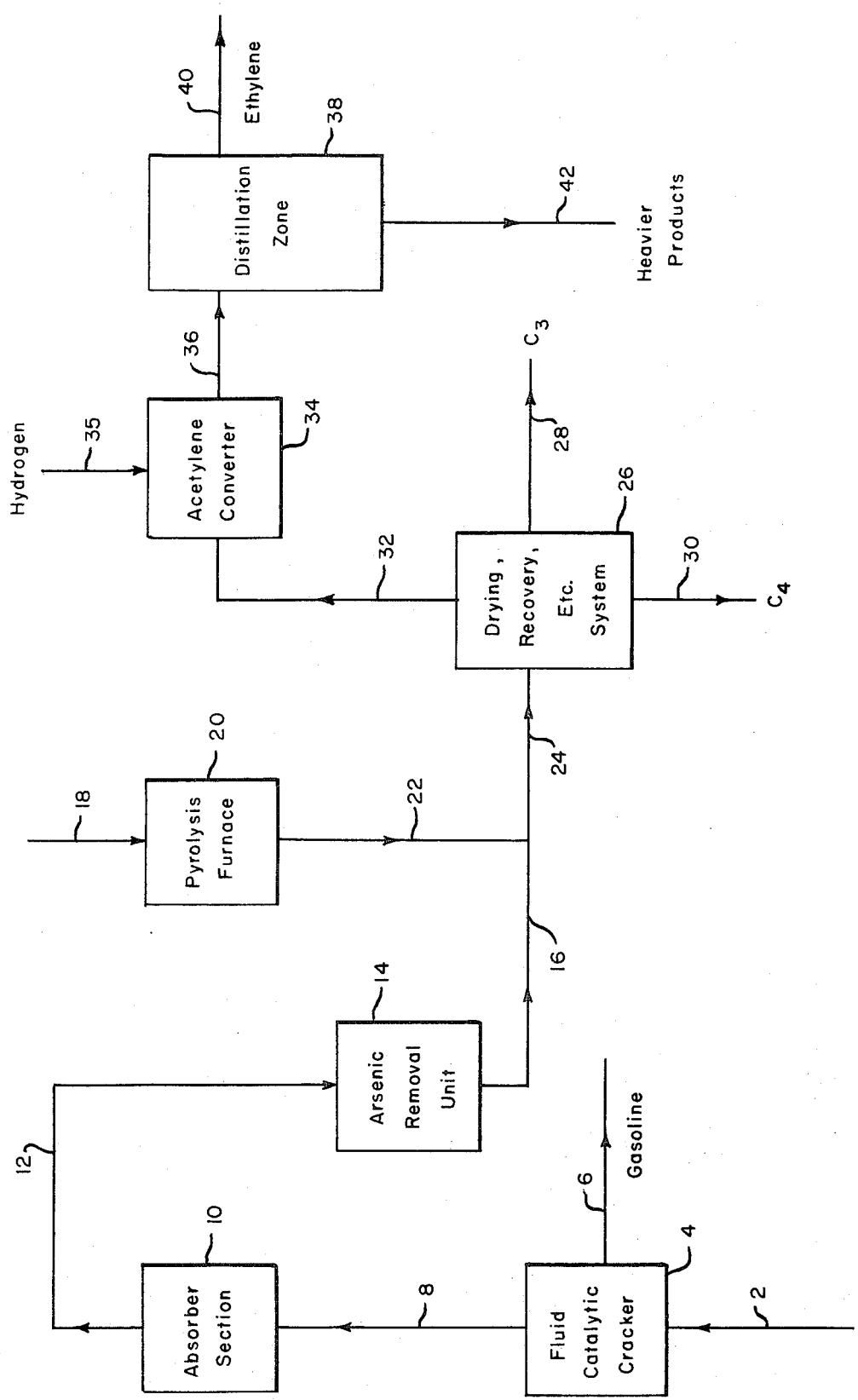

PROCESS FOR REDUCING THE ARSENIC CONTENT OF GASEOUS HYDROCARBON STREAMS BY USE OF SUPPORTED COPPER OR COPPER OXIDE

This invention relates to the removal of arsenic from gaseous streams and more particularly to a process for reducing the arsenic content of a gaseous hydrocarbon stream by the use of copper or copper oxide.

BACKGROUND OF THE INVENTION

Catalytic cracking is one of the principal methods for refining petroleum fractions to recover more valuable hydrocarbon products such as gasoline. The unit in which the cracking operation takes place generally employs a fluidized bed and thus is termed a fluid catalytic cracking (FCC) unit. A variety of lower boiling products in gaseous form are discharged from the FCC unit and these are usually further treated to recover separate hydrocarbon fractions, e.g. ethylene. This further treatment of FCC vapors may, as in the case of the hydrogenation of acetylene, involve the use of a noble metal catalyst. As is well known, noble metal catalysts are rapidly deactivated by feedstock impurities such as arsenic. It thus becomes desirable to reduce the arsenic content of the FCC gases to the lowest possible level before subjecting them to further treatment.

It should be noted that the exact form in which arsenic is present in FCC gases is difficult to determine. It is known, however, that FCC gases in which arsenic can be detected cause the aforesaid deleterious effects upon a noble metal catalyst. Although it is believed that a major portion of the arsenic contained in the gases is present as arsine ($AsH_3$), the term "arsenic" as used herein is intended to include arsenic in any combined gaseous form.

DESCRIPTION OF THE PRIOR ART

It is well known that arsenic in gaseous form is a highly toxic substance. Workers in the gas mask art have suggested the use of activated charcoal impregnated with a metal or metal oxide such as copper or copper oxide as a material through which air (or other oxygen-containing gases) may be passed for the removal of arsenic. Exemplary of these proposals are U.S. Pat. Nos. 1,520,437; 2,511,288 and 2,513,508.

It has been found more recently that the presence of arsenic in gasolines which are treated by contact with a noble metal containing catalyst causes a permanent deactivation of the catalyst. Suggestions have been made in the art to pretreat petroleum fractions to remove arsenic by use of a wide range of materials such as a lignite-based activated carbon (U.S. Pat. No. 3,542,669); silica gel impregnated with the sulfuric acid (U.S. Pat. No. 3,093,574); aluminum silicate (U.S. Pat. No. 2,939,833); or a salt of a metal not higher than copper in the electromotive series of metals (U.S. Pat. No. 2,781,297). U.S. Pat. No. 2,781,297 includes the teaching (Example XII) that the oxide of the metal (specifically copper oxide) is unsatisfactory for removing arsenic from the liquid gasoline type petroleum fractions there involved. This teaching appears to be reinforced by U.S. Pat. No. 2,778,779, entitled "Removal of Arsenic in Hydrocarbon Oils by Use of a Readily Reducible Metal Oxide and Water," which teaches that arsenic, when passed over an oxide of certain metals including copper, is oxidized and thereby rendered more soluble in water; the arsenic-containing hydrocarbon (gasoline or naphtha in all working examples) is then treated with water to dissolve (and remove) the oxidized arsenic compound. It would thus appear that copper oxide cannot be employed to directly remove arsenic from a liquid hydrocarbon stream.

SUMMARY OF THE INVENTION

It has now been discovered that a suitably dispersed material comprising copper, an oxide of copper or mixtures thereof will directly remove arsenic from gaseous hydrocarbon streams. For the purposes of this application, the copper-containing material will be termed a "sorbent," although that term is not intended to suggest that the arsenic removal is accomplished by physical adsorption. While not wishing to be bound by any particular theory, it is believed that some chemical reaction is involved between the arsenic and the sorbent wherein copper arsenide compounds such as cuprous arsenide ($Cu_3As$) are formed. At a minimum, it is believed that the removal of arsenic is accomplished by chemisorption; that is, the arsenic forms bonds with the surface atoms of the sorbent that are of comparable strength with ordinary chemical bonds and stronger than the bonds formed in physical adsorption.

Particularly surprising is the fact the dispersed sorbent will withstand an acceptable loading of arsenic before breakthrough even when the arsenic is present in a gaseous light hydrocarbon stream containing both olefins and water vapor. While many materials will function to remove arsenic from admixture with inert gases such as argon and such materials remain active for reasonable loadings of arsenic, most of these materials fail quickly in the removal of arsenic from light hydrocarbon gases such as the gases obtained from FCC units. In this context, the term "breakthrough" means the passage of arsenic beyond or downstream of the substance intended to remove it and is usually expressed as a percentage of the arsenic not removed in relation to the arsenic content of the charge stock.

The present invention provides a process for reducing the arsenic content of a gaseous hydrocarbon feedstream which comprises contacting said feedstream with a sorbent dispersed upon a supporting material, said sorbent comprising copper or an oxide of copper and having an oxygen uptake value, to be defined later, of at least 5 and more preferably at least 40.

The expression "oxygen uptake value" is a measure of the degree of dispersion of the sorbent on its support, expressed as milliliters of oxygen per gram of copper. The procedures for determining this value for a particular sorbent are detailed hereinbelow.

The invention further provides that the supporting material is preferably selected from the group consisting of high surface area refractory metal oxides or mixtures of such refractory metal oxides, although preferably the supporting material is a high surface area alumina. It is further provided that the hydrocarbons in the feedstream have from one to five carbon atoms per molecule with minor amounts of about two percent or less of higher carbon atoms molecules such as $C_6$. Preferably, the hydrocarbons in the feedstream have from one to three carbon atoms with minor amounts of about ten percent or less of hydrocarbons having from four to six carbon atoms. The feedstream normally includes olefins and water vapor. Preferably, the feedstream is substantially free of sulfur compounds and acetylenes. The arsenic content of the feedstream is generally in excess of 20 ppb and following contact with the sorbent the arsenic content of the feedstream is reduced to less than 20 ppb, preferably less than 10 ppb and more preferably less than 2 ppb. In this application the term "ppb" means "parts per billion" and "ppm" means "parts per million," and such parts are parts by volume unless otherwise indicated. Preferably, the present invention provides that the feedstream is contacted with the sorbent at a temperature in the range of 50° to 400°F. and more preferably in the range of 80° to 250°F.

DETAILED DESCRIPTION OF THE INVENTION

The charge stock for treatment in accordance with the invention is a gaseous hydrocarbon feedstream wherein the hydrocarbons preferably have from one to five carbon atoms per molecule and which feedstream contains arsenic as an inpurity, typically in an amount from about 20 ppb to about 20 ppm or more. Particularly preferred for treatment by the process of the invention are those light hydrocarbon gases obtained by the catalytic cracking of heavier petroleum hydrocarbons such as gas oils for producing primarily gasoline. These light gases from the FCC unit have been found to contain small concentrations of arsenic even though arsine, for example, is known to decompose at about 450°F. and the temperatures in the FCC unit are known to reach over 900°F. There is probably insufficient contact time in an FCC unit to decompose the arsine, or perhaps the arsine decomposes and reforms on cooling.

Preferably, the charge stock is free of sulfur compounds such as $H_2S$ since sulfur compounds appear to seriously interfere with the removal of arsines from gaseous hydrocarbon charge stocks. That is, the process of the invention will operate in the presence of sulfur compounds, but the loading of the supported copper oxide before breakthrough will be seriously impaired.

The manner of removing sulfur compounds from the charge stock may be by any of the methods well known in the art. Such methods include, for example, the use of liquid solutions of amines or the use of caustic solutions, e.g. sodium hydroxide solution.

It is also preferred that the charge stock for treatment in accordance with the invention be free or substantially free of acetylenes. Any acetylenes present in the feedstream might react with the copper to form copper acetylides which in their dry state are explosive.

The process of the invention will now be further described by reference to the attached FIGURE.

Referring to the FIGURE, the petroleum charge for catalytic cracking enters through line 2 into FCC unit 4 where it is converted under usual catalytic cracking conditions to a variety of lower boiling products, including gasoline type products. Gasoline is removed from FCC unit 4 through line 6. The other gaseous products of the cracking process, which products are of primary concern here, are removed from FCC unit 4 through line 8 and enter an absorber section 10. Absorber section 10 normally consists of several component units (not shown) such as an amine absorber, a knock-out drum to remove any entrained liquids from the gaseous products, and a heater to insure that the gases remain in the vapor phase. The FCC gases exiting from the heater unit of absorber section 10 have the typical composition shown in the following Table I:

TABLE I

| Component | Vol. % |
|---|---|
| Nitrogen | 9.5 |
| Hydrogen | 9.8 |
| Methane | 29.7 |
| Ethylene | 9.7 |
| Ethane | 12.6 |
| Propylene | 15.5 |
| Propane | 6.8 |
| Butenes | 0.5 |
| Butanes | 1.9 |
| Pentenes | 0.4 |
| Pentanes | 0.5 |
| Hexanes | 0.1 |
| Carbon Monoxide | 2.9 |

The FCC absorber gases are usually at a temperature from 80° to 150°F., more usually from 100° to 125°F., and at a pressure from 250 to 400 psig, more usually at a pressure from 290 to 360 psig. The increased pressures are those normally employed in the FCC unit and are used to propel the gases through the various units in the recovery train. The absorber gases leave the absorber section 10 through line 12 and pass into arsenic removal unit 14.

The function of arsenic removal unit 14 is to reduce the concentration of arsenic in the FCC absorber gases from a concentration in excess of 20 ppb to a concentration at the outlet of less than 20 ppb. The concentration of arsenic in the FCC absorber gases is usually on the order of 50 to 750 ppb but can be as high as 20 ppm or more. Preferably, the arsenic content of the gases is lowered to less than 10 ppb and more preferably to less than 20 ppb by arsenic removal unit 14.

The type of solid material employed in arsenic removal unit 14 is an important feature of the invention and will be discussed in detail hereinbelow. Suffice it to say here that the material comprises copper or an oxide of copper well dispersed upon a suitable support, preferably one having a high surface area.

The temperatures to be employed in arsenic removal unit 14 can suitably be from 50° to 400°F., are usually from 80° to 250°F., and are preferably from 100° to 200°F. Temperatures below 50°F. are undesirable because of increased cost and the decreased activity of the sorbent at those levels. Temperatures above the stated range are undesirable due to the increased expense of operating the process. Primarily excessive temperatures are undesirable for the further reason that when feedstreams contain both olefins and hydrogen, as do FCC absorber gases, hydrogenation of the olefins is promoted by high temperature levels. At 250°F., however, it has been found that less than one percent hydrogenation of propylene is experienced in the treatment of a typical FCC absorber gas to remove arsenic in accordance with the present invention.

The pressure to be employed in arsenic removal unit 14 is suitably atmospheric pressure or below to 1000 psig or more. FCC units typically operate to produce product gases, as noted above, at pressures from about 250 to 350 psig. The process of the present invention operates well at atmospheric pressure, but since it is expensive to depressure the FCC absorber gases and repressure the final products for transport through pipelines, it is desirable to operate the arsenic removal process at increased pressures of, say, 250 to 350 psig. A limitation on the maximum operating pressure is, however, the effect of pressure on promoting undesirable side reactions such as the polymerization and hydrogenation of any olefins which may be present in the feedstream. The gaseous volume hourly space velocity (GVHSV) at standard conditions of temperature and pressure can suitably be from 1000 to 36,000 v/v/hr and is usually from 2000 to 10,000 v/v/hr. The product is removed from the arsenic removal unit 14 through line 16.

Light hydrocarbon gases such as ethane and propane are fed through line 18 into pyrolysis furnace 20 for the purpose of cracking the ethane and propane to produce ethylene. After removal of liquid products (not shown) from pyrolysis furnace 20, the gaseous products are passed through line 22 where they are combined with the products in line 16 from the arsenic removal unit 14.

The combined gases in line 24 enter system 26 which consists of a number of units, not individually shown, for the purpose of drying and recovering various hydrocarbon fractions. A $C_3$ fraction, for example, can be removed through line 28 and a $C_4$ fraction through line 30. The stream of most present interest and of greatest volume is the $C_2$ stream containing small amounts of acetylene, which stream is shown in the FIGURE as being removed from system 26 through line 32 and which passes into an acetylene converter 34. The acetylene content is produced in the pyrolysis furnace 20. Hydrogen enters acetylene converter 34 by means of line 35.

Acetylene converter 34 may contain a catalyst which is sensitive to poisoning by even minute quantities of arsenic, and thus it is one of the main objectives of the present invention to protect the catalyst in the acetylene converter 34 from permanent deactivation by arsenic. Catalysts which are particularly susceptable to arsenic poisoning are those containing the noble metals such as platinum and palladium.

Hydrogenation conditions are, of course, employed in acetylene converter 34, and such conditions are well known to workers skilled in the art. The $C_2$ stream, substantially free of acetylene, is then taken from acetylene converter 34 through line 36 to a distillation zone 38 where ethylene is removed through line 40 and heavier products may be suitably removed through line 42. The heavier products may be recycled as feed to pyrolysis furnace 20, if desired.

It should be noted here that the arsenic removal unit 14 could have been positioned immediately before the acetylene converter 34 but such a location is not preferred for the reasons given above relating to the possible formation of explosive copper acetylides and, as noted, the acetylene is formed in pyrolysis furnace 20 and not in the FCC unit 4. Similarly, the same benefits would accrue for any arsenic-susceptible catalysts used in the hydrogenation of the propadiene in the $C_3$ stream from line 28.

PREPARATION OF DISPERSED SORBENT

The sorbent employed in the process of the invention is most easily converted to a high surface area form by dispersion onto a suitable high surface area support. The manner of dispersing the sorbent on the supports is not critical and may be accomplished by means well known in the art. One method is described in detail in Example I below. Briefly, the technique involves the deposition of copper from a solution, preferably aqueous, of a suitable copper salt such as cupric nitrate followed by conversion of the cupric nitrate to copper oxide by calcining in the presence of air. The copper salt which is employed must be one which will decompose to the desired copper oxide form or which can be oxidized to the desired copper oxide form under conditions which will not seriously impair the desired surface area characteristics of the support. Other methods of depositing the copper oxide are described in U.S. Pat. Nos. 2,511,288 and 2,513,508, both to Morrell et al.

The sorbent is normally used in the oxidized form but, if desired, conversion of dispersed copper oxide sorbent to copper may be accomplished by heating the supported sorbent to to least 700°F. in the presence of flowing hydrogen, as is well known in the art. The use of lower temperatures and/or short contact times with hydrogen would result in the production of mixtures of copper oxide and copper.

The amount of copper or copper oxide dispersed on the support is suitably from 1 to 30 weight percent and preferably from 10 to 20 weight percent, both the copper and copper oxide being calculated as copper. When the sorbent is in the form of copper oxide, the copper is preferably present in its highest oxidation state, i.e. CuO.

Suitable high surface area supports are those well known in the art as catalyst supports. Examples of suitable supporting materials are the usual porous naturally occurring or synthetically prepared high surface area, i.e. over about 50 m²/g, refractory metal oxides well known in the art as catalyst supports, e.g. alumina, silica, boria, thoria, magnesia or mixtures thereof. Preferably the supporting material is one of the partially dehydrated forms of alumina. More preferably, the alumina is one having a surface area in excess of 50 m²/g, preferably a surface area of 150 to 350 m²/g. Suitable forms of the higher surface area aluminas and their methods of preparation are described in the Kirk-othmer Encyclopedia of Chemical Technology, Second Edition, Volume 2, pages 41 et seq. Other suitable supports include clays, zeolites and crystalline silica aluminas.

EXAMPLE 1

The purpose of the example is to describe one preparation of a copper-containing material supported on a high surface area alumina. An aqueous solution of cupric nitrate trihydrate was prepared by adding 1211.39 g. of $Cu(NO_3)_3 \cdot 3H_2O$ (Mallinckrodt Analytical Reagent Grade) to distilled water to give a final volume of 1665 ml. The weight of this solution was 2364 g. and its specific gravity was 1.4198 g/cc. It contained the equivalent of 16.86 weight percent CuO.

A one-step incipient wetness technique impregnation of the alumina was carried out by adding, with stirring, the $Cu(NO_3)_3 \cdot 3H_2O$ solution to 2048 g. of 1/16 inch extrudates of a suitable alumina which had previously been heated to 1000°F. over a period of 6 hours and held at 1000°F. for 10 hours. The incipient wetness absorptivity of the alumina was 0.8130 ml/g of alumina. The wet material was dried with occasional stirring for 12 hours at 250°F. The dry material was then calcined by raising the temperature to 1000°F. over a period of 6 hours and holding at 1000°F. for 9 hours. The final composition of the material was approximately 13 weight percent Cu, present as copper oxide, the remainder being alumina. The compacted density was 0.730 g/cc and it had a nitrogen B.E.T. surface area of 180.6 m²/g and a nitrogen pore volume of 0.491.

Technical grade solutions may be employed in the fore-going procedure. The solutions are normally added at room temperature but elevated temperatures may be utilized. The alumina used in this preparation had an initial nitrogen B.E.T. surface area of 282 m²/g and a nitrogen pore volume of 0.63 cc/g.

ARSENIC REMOVAL

Several runs were made under varying conditions to illustrate the present invention. The results of these runs are presented in Examples 2–20 and Tables I and II below. The procedures employed for all tests in Examples 2–20 were identical and were as follows: Gaseous charge stocks were prepared by mixing a sufficient amount of a blend of 2000 ppm $AsH_3$ in nitrogen (supplied by Matheson Gas Co.) with one of the following diluent gases to obtain a charge stock having the designated ppm of $AsH_3$ as shown in the tables below.

Diluent Gas No. 1.

A pure hydrocarbon blend having the following approximate analysis:

| Component | Vol. % |
|---|---|
| Propylene | 15 |
| Ethane | 12 |
| Ethylene | 10 |
| Methane | 30 |
| Hydrogen | 15 |
| Nitrogen | 18 |
| Total | 100 |

Diluent Gas No. 2.

A commercially produced ethylene concentrate of the following analysis:

| Component | Vol. % |
|---|---|
| Nitrogen | 2.3 |
| Hydrogen | 0.9 |
| Methane | 6.7 |
| Ethylene | 4.6 |
| Ethane | 6.6 |
| Propylene | 28.9 |
| Propane | 10.4 |
| 1,3-Butadiene | 0.3 |
| Butenes | 8.9 |
| Isobutane | 8.3 |
| N-Butane | 0.4 |
| Pentenes | 9.4 |
| Isopentane | 9.8 |
| N-Pentane | 0.3 |
| Benzene | 0.2 |
| Cyclohexane | 0.9 |
| N-Hexane | 1.1 |
| Arsine as arsenic ppb (weight) | 620 |
| Arsine as arsenic ppm (weight) | 0.62 |
| Arsine as arsenic ppm (volume) | 0.20 |

Diluent Gas No. 3.

A commercial FCC absorber gas of the following analysis:

| Component | Typical Vol. % | Range Vol. % |
|---|---|---|
| Carbon Monoxide | 1.6 | 0.2 – 3.4 |
| Hydrogen | 7.9 | 9 – 12 |
| Nitrogen | 9.8 | 6 – 10 |
| Methane | 30.0 | 27 – 33 |
| Ethylene | 9.8 | 9 – 11 |
| Ethane | 12.4 | 10 – 13.0 |
| Propylene | 17.2 | 15 – 18.0 |
| Propane | 7.6 | 7 – 15 |
| Butenes | 0.4 | 0 – 1.0 |
| Isobutane | 1.3 | 1 – 2.0 |
| n-Butane | 0.1 | 0 – 1.0 |
| $C_5$ | 1.7 | 0 – 3 |
| $C_6$ | 0.2 | 0 – 1 |
| Total | 100.0 | |
| Arsenic | 450 ppb | 50 – 750 ppb |
| Hydrogen Sulfide | 1 ppm(wt) | 0 – 2 ppm |
| Carbonyl Sulfide | 3.4 ppm(wt) | 0 – 5 ppm |

The diluent gases before the addition of arsine were passed through a water bubbler to saturate them with water vapor at ambient temperature.

The reactor containing the supported sorbent consisted of a ⅜ inch I.D. stainless steel cylinder, with a ⅛ inch O.D. thermowell extending along its axis. The reactor was suitably heated. The temperature at the center of the supported sorbent material was measured by means of an iron-constantan thermocouple inserted into the thermowell. The test gas was introduced at the bottom of the reactor, passing through an approximately 6-inch-long bed of quartz chips which served to preheat the gas stream.

The sorbents were dispersed on various support materials in accordance with the procedures set forth in Example 1. The bed of supported sorbent within the reactor was approximately 4 to 8 inches in length and consisted of 5–10 cc of material sized to 20–20 mesh. In all cases, the weight percent of copper compared with the total weight of support material and sorbent was 13 percent.

The arsine not removed by the passage through the bed of supported sorbent was scrubbed from the effluent gas stream by a pyridine solution containing 0.50 g. silver diethyldithio-carbamate (Fisher Certified Reagent) per 100 ml. pyridine. This silver salt combines with the arsine to form a highly colored complex, permitting colorimetric monitoring of the total arsine breakthrough accumulation. Small samples were periodically drawn from the arsine scrubber and the optical transmittance at 540 mm. wavelength was measured with a Bausch and Lomb Spectronic 70 spectrophotometer. This optical transmittance was then plotted as a function of time. The numerical derivative of this curve was calculated to determine the rate of arsine breakthrough. The percent breakthrough figures given in the Tables below represent the percentage of the arsenic not removed in relation to the arsenic content of the charge stock.

The results of a first series of runs in shown in Table II below:

TABLE II

| Example | Sorbent | Support | Temp., °F. | Pressure, p.s.i.g. | stock GVHSV | Conc. $AsH_3$ in charge stock (p.p.m.) | Diluent gas [2] | Cumulative as loading (weight percent) | Comment |
|---|---|---|---|---|---|---|---|---|---|
| 2 | CuO | $\gamma$-$Al_2O_3$ | 80 | 15 | 3,000 | 3 | ([1]) | 0.3 | No breakthrough. |
| 3 | CuO | $\gamma$-$Al_2O_3$ | 80 | 15 | 3,000 | 40 | No. 3 | 4.0 | 2% breakthrough. |
| 4 | CuO | $\gamma$-$Al_2O_3$ | 150 | 15 | 3,000 | 40 | No. 3 | 4.5 | No breakthrough. |
| 5 | CuO | $\gamma$-$Al_2O_3$ | 150 | 15 | 3,000 | 200 | No. 3 | 5.0 | Do. |
| 6 | CuO | $\gamma$-$Al_2O_3$ | 150 | 15 | 3,000 | 200 | No. 1 | 8.1 | 15% breakthrough. |
| 7 | CuO | $\gamma$-$Al_2O_3$ | 150 | 15 | 3,000 | 40 | No. 1 | 8.9 | 30% breakthrough. |
| REGENERATED SUPPORTED CuO FROM EXAMPLE 7 3½ HOURS IN AIR AT 500° F. | | | | | | | | | |
| 8 | CuO | $\gamma$-$Al_2O_3$ | 150 | 15 | 3,000 | 40 | No. 1 | 10.0 | No breakthrough. |

[1] Diluent gas consisted of 50% propylene and 50% nitrogen.
[2] Designated by No. from description above.

Referring to Table II, the runs for Examples 2–8 show, among other things, that an increased arsenic loading can be achieved even after breakthrough by increasing the temperature. Regeneration under mild conditions occurred between Examples 7 and 8 and, as shown by Example 8, the sorbent could again accept more arsenic loading.

EXAMPLE 9

Example 4 was repeated except the GVHSV was increased to 9000 and the charge stock contained 50 ppm of $AsH_3$. The arsenic loading (weight percent) on the sorbent at 10 percent breakthrough was 4.2.

EXAMPLE 13

Example 12 was repeated except the temperature was 150°F. The arsenic loading (weight percent) on the sorbent at 10 percent breakthrough was 1.1.

A series of runs was made to show the effect of sequential regenerations on the capacity of the sorbent for arsenic before breakthrough. The runs are summarized in Table III below. Referring to Table III, the capacity of the sorbent for arsenic loading before 20 percent breakthrough was increased with successive regenerations, i.e. 2.2 to 3.3 to 5.2 to 6.4, despite the fact the arsenic loadings were cumulative. The increased sorbent capacity may be due to the successively increased regeneration temperatures employed, i.e. 250°F. to 350°F. to 700°F.

TABLE III

| Example | Sorbent | Support | Temp., °F. | Pressure, p.s.i.g. | GVHSV | Conc. $AsH_3$ in charge stock (p.p.m.) | Diluent gas [5] | Arsenic loading (weight percent) | |
|---|---|---|---|---|---|---|---|---|---|
| | | | | | | | | 10% breakthrough | 20% breakthrough |
| 14 | CuO | $\gamma$-$Al_2O_3$ | 200 | 15 | 9,000 | 50 | No. 3 [1] | 1.8 | 2.2 |
| REGENERATED SUPPORTED CuO FROM EXAMPLE 14, 16 HOURS IN AIR AT 250° F. | | | | | | | | | |
| 15 | CuO | $\gamma$-$Al_2O_3$ | 200 | 15 | 9,000 | 50 | No. 3 [2] | 2.6 | 3.3 |
| REGENERATED SUPPORTED CuO FROM EXAMPLE 15, 16 HOURS IN AIR AT 350° F. | | | | | | | | | |
| 16 | CuO | $\gamma$-$Al_2O_3$ | 200 | 15 | 9,000 | 50 | No. 3 [3] | 3.7 | 5.2 |
| REGENERATED SUPPORTED CuO FROM EXAMPLE 16, 16 HOURS IN AIR AT 700° F. | | | | | | | | | |
| 17 | CuO | $\gamma$-$Al_2O_3$ | 200 | 15 | 9,000 | 50 | No. 3 [4] | 5.2 | 6.4 |

[1] Charge contained 200 p.p.m. $H_2S$.
[2] No $H_2S$; total as loading 5.5% at 20% breakthrough.
[3] No $H_2S$; total as loading 10.7% at 20% breakthrough.
[4] No $H_2S$; total as loading 17.1% at 20% breakthrough.
[5] Designated by No. from description above.

EXAMPLE 10

Example 9 was repeated except the charge stock was made from Diluent Gas No. 1 and the catalyst was a commercial sample prepared in accordance with the procedure of Example 1 above. The arsenic loading (weight percent) on the sorbent at 10 percent breakthrough was 20 and at 20 percent breakthrough was 22.

EXAMPLE 11

The copper oxide sorbent of Example 1 was reduced to copper by heating a sample to 1000°F. at a rate of about 100°F. per minute in a flowing mixture of 10 percent hydrogen in nitrogen (40 ml/min) followed by holding at 1000°F. for 3 hours in 100 percent hydrogen followed by cooling with a mixture of 100% $H_2$ in nitrogen. The material by visual inspection appeared to be metallic copper from its reddish hue. The reduced sorbent was found to give a pattern for metallic copper by X-ray diffraction. Example 9 was repeated except using the reduced copper sorbent and the charge stock was prepared using Diluent Gas No. 2. The arsenic loading (weight percent) on the sorbent at 10 percent breakthrough was 3.7, and at 33 percent breakthrough was 4.2.

Example 11 shows that copper in the zero valent form is an active sorbent.

EXAMPLE 12

Example 9 was repeated except the charge stock was prepared from Diluent Gas No. 1; the charge stock contained 200 ppm of $H_2S$; and the temperature was 120°F. The arsenic loading (weight percent) on the sorbent at 10 percent breakthrough was 4.5 and at 33 percent breakthrough was 4.8.

EXAMPLE 18

In the run for this example, the copper oxide sorbent of Example 1 was pre-reduced in a stream of 10% $H_2$ – 90% $N_2$ for seven hours at 500°F. Gravimetric analysis indicated approximately 50 percent of the oxygen associated with the CuO had been reduced. This partially reduced sorbent was run the same as in Example 14 above except there was no $H_2S$ in the charge stock and the temperature was 150°F. The arsenic loading (weight percent) at 10 percent breakthrough was 4.5.

EXAMPLE 19

Example 9 was repeated except the support was a very low surface area alpha-alumina. The arsenic loading (weight percent) was less than 0.1 at 33 percent breakthrough showing the use of low surface area supports gives poor results.

EXAMPLE 20

Example 9 was repeated except the support was a silica gel having a surface area of about 350 m²/g. The arsenic loading (weight percent) was 0.1 at 10 percent breakthrough and 0.4 at 33 percent breakthrough.

OXYGEN UPTAKE

The materials (sorbents plus support) used in the runs reported in the above Examples were tested for oxygen uptake values by the following procedure: Approximately 2.5 g. of each supported sorbent sample was heated (50°C./min) to 400°C. in flowing hydrogen (40 mls/min). Each was held at this temperature for 2 hours, then treated in flowing helium (40 mls/min) for one hour at the same temperature. Oxygen uptake values were measured after the samples were cooled to 25°C. by the pulse adsorption method fully described in the article "Separate Determination of the Surface of Complex Catalysts by Chromatographic Methods, 1. Nickel on Carriers" by N. E. Buyanova et al., appearing first in Kinetika i Kataliz, Vol. 8, NO. 4, pp. 868–877, July-August, 1967 and translated into English and appearing in Kinetics and Catalysis, 8, 787, (1967). The oxygen uptake values for each sample are reported below in Table IV, expressed in terms of oxygen uptake at 77°F. in units of ml. S.T.P. of oxygen per gram of copper in the sample.

TABLE IV

| Example No. | Sorbent | Support | Nominal Copper in Sample (Weight Percent) | Oxygen Uptake (ml. $O_2$/g. Cu) |
|---|---|---|---|---|
| 19 | CuO | $Al_2O_3$ | 13 | 0.27 |
| 20 | CuO | $SiO_2$ | | 5.9 |
| 2–10; 12–18 | CuO | $Al_2O_3$ | 13 | 54 |

It can be seen that the oxygen uptake value should be at least 5. Preferably, the sorbent is better dispersed to give an oxygen uptake value of at least 20, more preferably at least 40. The theoretical upper limit for a monolayer of copper is 176.

Another series of runs was made wherein a slipstream of a commerical FCC absorber gas without the addition of added amounts of $AsH_3$ was passed through a 1" in diameter by 4-foot-long bed of a copper oxide sorbent prepared as described in Example 1. The commerical FCC absorber gas had a composition within the range as shown above for Diluent Gas No. 3. Again, there were no added amounts of $AsH_3$. The results are presented in the Examples given below.

Example 21

In the run for this Example, the bed was operated at 100°F. and a pressure of about 260–280 psig for the first 350 hours, and the temperature was then increased to 200°F. and the run continued for a total elapsed time of 1000 hours. The GVHSV was 9000 for the first 350 hours and then 4500 for the remainder of the run. The cumulative arsenic loading (weight percent) on the sorbent was 0.9. The run was terminated without any breakthrough.

EXAMPLE 22

In the run for this Example, the bed was operated at 100°F. and 260–280 psig and a GVHSV of 4500 for 300 hours and then at 150°F. and a 3000 GVHSV for a total time of 4000 hours. The cumulative arsenic loading was 2.0+ weight percent. No breakthrough of arsenic was noted.

EXAMPLE 23

In the run for this Example, the bed was operated at 100°F., a pressure of 260–280 psig and a GVHSV of 9000 for 325 hours and then at 150°F. and a GVHSV of 3000 for a total time of 4000 hours. The cumulative arsenic loading was 3.0+ weight percent. No breakthrough was noted.

In each of Examples 21–23 above, a fresh batch of sorbent was employed.

Resort may be had to such variations and modifications as fall within the spirit of the invention and the scope of the appended claims.

We claim:

1. A process for reducing the arsenic content of a gaseous hydrocarbon feedstream having greater than 20 ppb of arsenic to produce a product having less than 10 ppb of arsenic which comprises contacting said feedstream with a sorbent dispersed upon a supporting material, said sorbent comprising copper or an oxide of copper and having an oxygen uptake value of at least 5.

2. A process as recited in claim 1 wherein said supporting material is a refractory metal oxide having a surface area of greater than 50 m²/g.

3. A process as recited in claim 2 wherein said hydrocarbons in said feedstream have from one to five carbon atoms per molecule.

4. A process as recited in claim 3 wherein said hydrocarbon feedstream includes olefins and water vapor and is substantially free of acetylenes.

5. A process as recited in claim 4 wherein said contacting takes place at a temperature in the range of 50°F. to 400°F.

6. A process for reducing the arsenic content of a gaseous hydrocarbon feedstream having greater than 20 ppb of arsenic to produce a product having less than 10 ppb of arsenic which comprises contacting said feedstream with a sorbent dispersed on a refractory metal oxide having a surface area of greater than 50 m²/g, said sorbent consisting essentially of copper or an oxide of copper and having an oxygen uptake value of at least 20.

7. A process as recited in claim 6 wherein said hydrocarbons in said feedstream have from one to five carbon atoms per molecule.

8. A process as recited in claim 7 wherein said contacting takes place at a temperature in the range of 80°F. to 250°F.

9. A process in accordance with claim 1 wherein said sorbent consists of copper having an oxygen uptake value of at least 40.

10. A process as recited in claim 9 wherein said supporting material is an alumina having a surface area of greater than 50 m²/g.

11. A process as recited in claim 10 wherein said hydrocarbons in said feedstream have from one to five carbon atoms per molecule.

12. A process in accordance with claim 1 wherein said sorbent consists of an oxide of copper having an oxygen uptake value of at least 40.

13. A process as recited in claim 12 wherein said supporting material is an alumina having a surface area of greater than 50 m²/g.

14. A process as recited in claim 13 wherein said hydrocarbons in said feedstream have from one to five carbon atoms per molecule.

15. A process for reducing the arsenic content of a gaseous hydrocarbon feedstream containing arsenic in amounts in excess of 20 ppb and being substantially free of acetylenes to produce a product having less than 10 ppb of arsenic, which process comprises contacting said feedstream with a sorbent dispersed on a supporting material, said sorbent consisting of copper or an oxide of copper and having an oxygen uptake value of at least 20.

16. A process as recited in claim 15 wherein said hydrocarbon feedstream includes olefins and water vapor.

17. A process as recited in claim 16 wherein said supporting material is an alumina having a surface area of greater than 50 m²/g.

* * * * *